(12) United States Patent
Milot

(10) Patent No.: US 12,170,677 B2
(45) Date of Patent: Dec. 17, 2024

(54) CYBERSECURITY PREDICTIVE DETECTION USING COMPUTER INPUT DEVICE PATTERNS

(71) Applicant: Bradley & Rollins, Prévost (CA)

(72) Inventor: Bertrand Milot, Prevost (CA)

(73) Assignee: BRADLEY & ROLLINS, Prevost (CA)

( * ) Notice: Subject to any disclaimer, the term of this patent is extended or adjusted under 35 U.S.C. 154(b) by 278 days.

(21) Appl. No.: 17/538,195

(22) Filed: Nov. 30, 2021

(65) Prior Publication Data

US 2022/0174079 A1    Jun. 2, 2022

Related U.S. Application Data

(60) Provisional application No. 63/119,113, filed on Nov. 30, 2020.

(51) Int. Cl.
*H04L 9/40* (2022.01)
*G06N 20/00* (2019.01)
*H04L 9/32* (2006.01)

(52) U.S. Cl.
CPC ......... *H04L 63/1416* (2013.01); *G06N 20/00* (2019.01); *H04L 9/3247* (2013.01); *H04L 63/1425* (2013.01)

(58) Field of Classification Search
CPC ............... H04L 63/083; H04L 63/1416; H04L 63/1425; H04L 9/3231; H04L 9/3247; G06N 20/00

See application file for complete search history.

(56) References Cited

U.S. PATENT DOCUMENTS

| | | | | |
|---|---|---|---|---|
| 2005/0278550 | A1* | 12/2005 | Mahone | H04M 15/47 713/189 |
| 2015/0310196 | A1* | 10/2015 | Turgeman | H04W 12/06 726/19 |
| 2016/0110551 | A1* | 4/2016 | Fugate | G06F 21/552 726/25 |
| 2018/0160309 | A1* | 6/2018 | Turgeman | G06F 3/041 |
| 2018/0173891 | A1* | 6/2018 | Wang | G06F 21/6245 |

(Continued)

FOREIGN PATENT DOCUMENTS

EP    3 529 969    8/2019

*Primary Examiner* — Gary S Gracia
(74) *Attorney, Agent, or Firm* — Benoit&Cote Inc.; Charles-Andre Caron

(57) ABSTRACT

A method and system for determining a risk of a cybersecurity event related to a user. Initial user-related data associated with user interactions are collected, comprising user-device, user-network and user-resource interaction data. A unique user profile is determined and defines the digital identity of the user based on the initial user-related data. A first risk processing engine collects, in real time and repeatedly, a real-time user-related data associated with real-time user interactions and detects an anomaly in user's behavior based on the collected real-time user-related data and the digital identity of the user. A second risk processing engine collects complementary data associated with the user (dark web or digital exposure data) to determine a risk profile of the user, and determines the risk of the cybersecurity event based on the anomaly in the user's behavior and the complementary data, in real-time over a complete period of use of resources.

18 Claims, 6 Drawing Sheets

(56) References Cited

U.S. PATENT DOCUMENTS

| | | | |
|---|---|---|---|
| 2019/0272328 A1* | 9/2019 | Dubyak | G06F 40/40 |
| 2019/0334940 A1* | 10/2019 | Bar Noy | H04L 43/04 |
| 2019/0334947 A1* | 10/2019 | Govardhan | G06F 16/951 |
| 2020/0042681 A1* | 2/2020 | Benkreira | H04L 63/102 |
| 2020/0267183 A1* | 8/2020 | Vishwanath | H04L 63/1483 |
| 2020/0273040 A1* | 8/2020 | Novick | G06Q 20/4016 |
| 2020/0382538 A1* | 12/2020 | Feezell | H04L 63/1433 |
| 2021/0117979 A1* | 4/2021 | Breitling | G06F 18/2431 |
| 2021/0211452 A1* | 7/2021 | Patel | H04L 63/1416 |
| 2021/0360018 A1* | 11/2021 | D'Agostino | G06Q 10/0635 |
| 2022/0174079 A1* | 6/2022 | Milot | H04L 9/3247 |

* cited by examiner

CYBERSECURITY PREDICTIVE DETECTION USING COMPUTER INPUT DEVICE PATTERNS

CROSS-REFERENCE TO RELATED APPLICATIONS

This application claims benefit from U.S. patent application 63/119,113, filed Nov. 30, 2020, the specification of which is hereby incorporated herein by reference in its entirety.

TECHNICAL FIELD

The subject matter disclosed generally relates to computer security, systems, infrastructures, organizational assets, system information, etc. More specifically, it relates to a method for predicting cybersecurity risk related to a user or entity in a network by monitoring a behavior of the user or entity.

BACKGROUND

There are various methods for detecting cybersecurity events, but most fail to address the greatest of the risks, which is human risk. By relying on passwords, digital certificates and computer behavior, if a password is cracked or stolen, or in case of theft of an electronic device, data can be accessed by other people or systems using the authorization of the compromised device or credentials.

Also, authorized employees may access corporate data in a fraudulent manner, which may be undetected because they have appropriate credentials to access confidential data.

SUMMARY

According a first aspect of the disclosure, there is provided a method for determining a risk of a cybersecurity event related to a user, the method executable by a system comprising a processor coupled to a first risk processing engine and a second risk processing engine, the system being communicatively coupled to a user device having peripheral devices configured to interact with a user, and a storage for storing a unique user profile and a digital identity, the method comprising:

collecting, by the processor, an initial user-related data associated with user interactions, the user-related data comprising user-device interaction data generated in response to user interactions with the peripheral devices, user-network interaction data generated in response to user-network interactions, and user-resource interaction data generated in response to user-resource interactions;

determining, by the processor, the unique user profile and generating the digital identity of the user based on the initial user-related data;

collecting, by the first risk processing engine, in real time and repeatedly, a real-time user-related data associated with real-time user interactions during a first period of time, and detecting, by the first risk processing engine, an anomaly in user's behavior based on the collected real-time user-related data and the digital identity of the user;

collecting, by the second risk processing engine, a complementary data associated with the user to determine a risk profile of the user, the complementary data comprising a dark web data and a digital exposure data; and determining, by the second risk processing engine, the risk of the cybersecurity event based on the anomaly in the user's behavior and the complementary data, in real-time over a complete period of use of resources.

According to an embodiment, user-device interactions data comprises data related to micromovements of a computer mouse, measured click speed and typing speed of detected keystrokes on a keyboard.

According to an embodiment, the method further comprises measuring trajectories and velocities of a computer mouse micromovements before and after a click of the user in response to user physical interaction with the computer mouse.

According to an embodiment, the method further comprises generating an alert in response to the risk of the cybersecurity event.

According to an embodiment, determining the unique user profile further comprises determining a user digital signature.

According to an embodiment, the method further comprises training a machine learning algorithm and using machine learning to determine the anomaly based on a real-time data related to user interactions.

According to an embodiment, the complementary data further comprises a cyber reflexes data.

According to an embodiment, the method further comprises collecting neuroscience testing results by performing a neuroscience testing prior to determining the risk of the cybersecurity event and determining the risk of the cybersecurity event based on the anomaly in combination with the neuroscience testing results.

According to an embodiment, the method further comprises determining a level of exposure to a hazard.

According to an embodiment, user-device interactions data comprises data related to a process consumption of the user device.

According to an embodiment, the method further comprises updating the unique user profile and the digital identity of the user based on the real-time user-related data and the anomaly in user's behavior According to an embodiment, the method further comprises updating the unique user profile and the digital identity of the user based on the anomaly in user's behavior in response to determining that the anomaly possesses a low risk of a cybersecurity event.

According to an embodiment, the dark web data comprises determined presence of user-related data in dark and deep web resources and the digital exposure data comprises data on exposure of the user from open-source intelligence (OSINT).

According a first aspect of the disclosure, there is provided a system for determining a risk of a cybersecurity event related to a user, the system comprising a processor coupled to a first risk processing engine and a second risk processing engine, the system being communicatively coupled to a user device having peripheral devices configured to interact with the user, and a storage for storing a unique user profile and a digital identity, the processor configured to: collect an initial user-related data associated with user interactions, the user-related data comprising user-device interaction data generated in response to user-device interactions with the peripheral devices, user-network interaction data generated in response to user-network interactions, and user-resource interaction data generated in response to user-resource interactions; and to determine the unique user profile and generating the digital identity of the user based on the initial user-related data;

the first risk processing engine configured to: collect, by, in real time and repeatedly, a real-time user-related data associated with real-time user interactions during a first period of time, and detect an anomaly in user's behavior based on the collected real-time user-related data and the digital identity of the user; and the second risk processing engine configured to: collect a complementary data associated with the user to determine a risk profile of the user, the complementary data comprising a dark web data and a digital exposure data; and determine the risk of the cybersecurity event based on the anomaly in the user's behavior and the complementary data, in real-time over a complete period of use of resources.

According to an embodiment, the user-device interactions data comprises data related to micromovements of a computer mouse, measured click speed and typing speed of detected keystrokes on a keyboard.

According to an embodiment, the system measures trajectories and velocities of a computer mouse micromovements before and after a click of the user in response to user physical interaction with the computer mouse.

According to an embodiment, the system is further configured to perform a neuroscience testing to generate neuroscience testing results prior to determining the risk of the cybersecurity event and configured to determine the risk of the cybersecurity event based on the anomaly in combination with the neuroscience testing results.

According to an embodiment, user-device interactions data comprises data generated in response to process consumption of the user device.

According to an embodiment, the system is configured to update the unique user profile and the digital identity of the user based on the real-time user-related data and the anomaly in user's behavior.

According to an embodiment, the system is configured to update the unique user profile and the digital identity of the user based on the anomaly in user's behavior in response to determining that the anomaly possesses a low risk of a cybersecurity event.

In accordance with at least one embodiment, a method for determining a risk of a cybersecurity event is provided. The method comprises: collecting data of user interactions with any one of a device, a network and a resource; determining a unique user profile, digital identity or digital signature based on the collected and processed data; keep collecting data of user interactions in real time over a complete period of use of resources with any one of the device, the network and the resource to update the unique user profile, digital identity or digital signature at a regular interval, or (more generally) repeatedly over a period of time, and to detect an anomaly or behavioral change in comparison with the unique user profile, digital identity or digital signature; collecting data from neuroscience testing; collecting user data from the web to determine a level of exposure and risk profile of the user, comprising any one of: presence of user-related data in dark and deep web resources and exposure of the user from OSINT and other sources as social networks; and determining the risk of the cybersecurity event based on the anomaly or behavioral change, on results of the neuroscience testing and on the level of exposure of the user, in real-time over the complete period of use of resources by running all the collected information and data through a next generation risk processing engine.

The method may further comprise orchestrating and automating a response and escalation procedure based on the determined risk of the cybersecurity event thereby mitigating the risk of the cybersecurity event.

In accordance with at least one embodiment, a method for determining a risk of a cybersecurity event is provided. The method comprises: collecting data of user interactions with any one of a device, a network and a resource; determining a user profile based on the collected data; keep collecting data of user interactions in real time over a complete period of use of resources with any one of the device, the network and the resource to detect an anomaly in comparison with the user profile; collecting data from neuroscience testing; collecting user data from the web to determine a level of exposure of the user, comprising any one of: presence of identity related data in dark web resources and exposure of the user in social networks; and determining the risk of the cybersecurity event based on the anomaly, on results of the neuroscience testing and on the level of exposure of the user, in real-time over the complete period of use of resources.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

There is described below a method for user and entity behavior analytics (UEBA), also known as user behavior analytics (UBA), which collects and analyses data on the physiological behavior of a user or entity accessing resources on a computer or in a network environment and detects behavior anomalies to automatically trigger an alarm.

The method allows detecting a risky behavior, i.e., detecting user-network interactions, user-device interactions and user-resource interactions (which together belong to a user behavior or entity behavior), which can be determined to have a significant risk of cybersecurity breach when comparing said behavior with a digital profile or digital identity of the user. The digital identity is perpetually updated and improved based on the interaction of the user with the system. Since the behavior of the user can be modified either by having another person using the user credentials or device, or by having the same user as always act strangely, the detection can be made for identify theft, data breach, vandalism or any other unauthorized action by an authorized employee, or unvoluntary mistakes by an authorized employee. By making such a detection early, before a cybersecurity event such as a breach or theft of confidential data for example, the cybersecurity event can be avoided.

The method therefore allows quantifying human risk, which is among the most critical sources of cybersecurity breaches especially in corporate environments and which is hard to detect and to quantify. It also allows dynamic, real-time monitoring (data processing->real-time risk rating->monitoring) and prediction that it is likely a cybersecurity event could take place in the near future, and therefore a response can be made in real-time by automatically detecting that a risk of a cybersecurity event is high and triggering an alarm/alert and/or preventive and/or proactive action (e.g., locking user's workstation, his domain account, restrict his Internet accesses, etc.).

Figure 1:
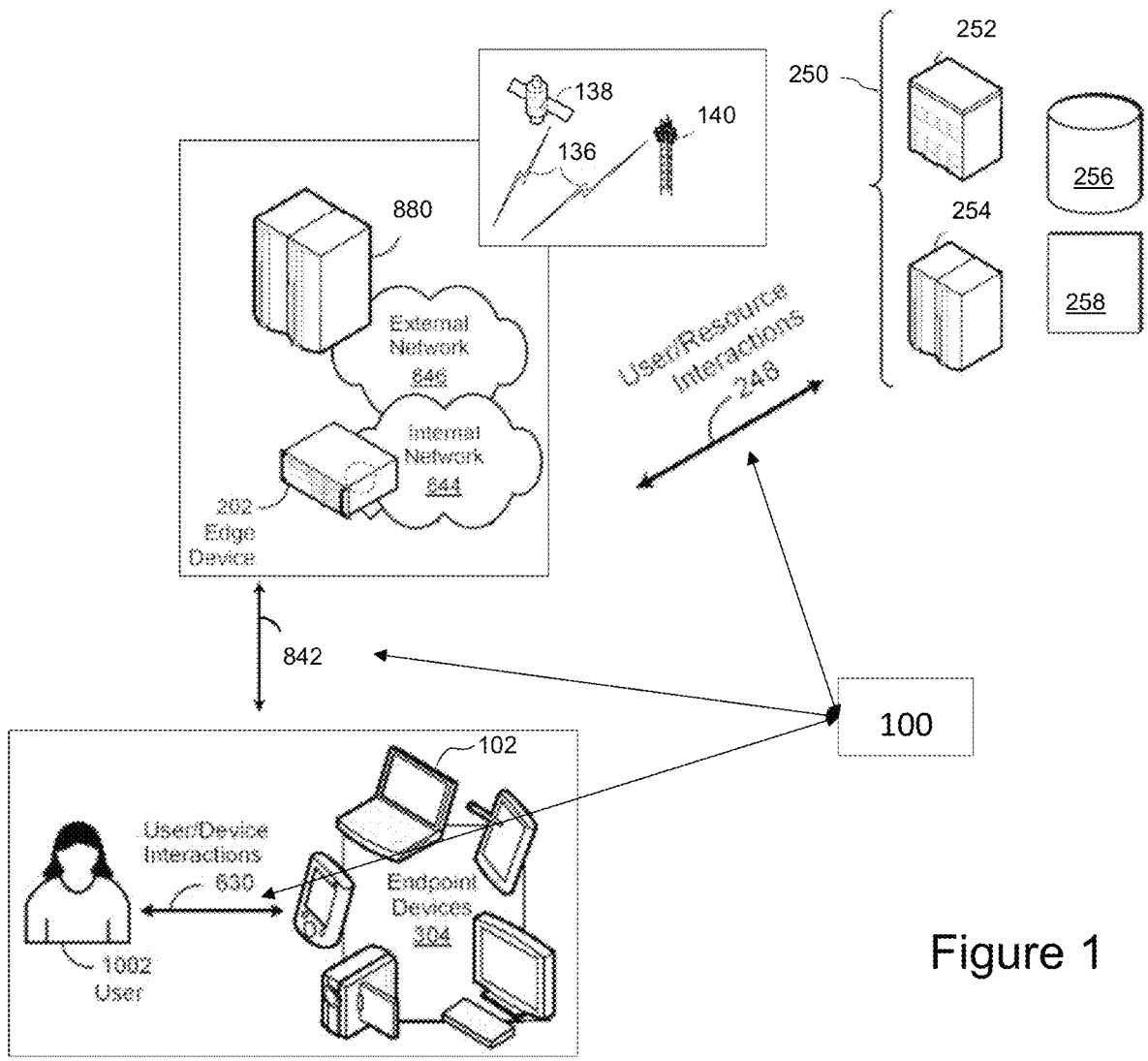
FIG. 1 is a schematic diagram illustrating a system for collecting user behavior, i.e., user interactions with devices, with a network and with resources, according to an embodiment of the invention.

Now referring to FIG. 1. there are shown systems in which interactions between a user and different components of a multicomponent system can be used to collect user-related data of the user behavior (i.e., the interactions as a whole) in real time. Real time involves instantaneous action once the action takes place, such as instantaneously collecting data once it is generated.

The user 1002 interacts with various endpoint devices 304, which may be, for example: a computer, a laptop, a notepad, a phone, a camera, etc. The endpoint devices 304 each have a processor such as a general-purpose processor, such as central processing unit (CPU) or a processor dedicated to a specific purpose, such as graphics processing unit (GPU). The endpoint devices 304 each has input/output devices (also referred to herein as "peripheral devices" or "computer input devices"), such as one or more displays (for example, touch screens), microphone(s), keyboard(s), computer mouse (mice), speaker(s), etc. These input/output devices are configured to render various prompts to the user, to receive user's responses and user's input, and to enable other interaction of the user 1002 with the endpoint devices 304. A "user device 102" may be any type of endpoint device 304: a laptop, a phone, etc.

Computer input device patterns are measured and analysed. User interactions with the user device 102 and, more specifically, with the computer input devices, such as, for example, mouse micromovements, displacement velocity with the mouse, keystroke typing speed and other mouse events or keyboard events can be used to profile an individual by determining that typical patterns within certain parameters (forming a profile) are to be associated to that individual in view of the individual's history of computer interactions. In some embodiments, a software program executing on the user device 102 (or another device of the endpoint devices 304) based on a request received from a processor 100 can detect these user actions and transmit an initial user-related data which provides information regarding such user interactions to the processor 100. Alternatively, the processor 100 may detect such events remotely. Based on such initial user-related data, the processor 100 may then associate the user 1002 to a specific unique user profile and/or to a digital identity and/or digital signature taking into account these detected user actions. The unique user profile is generated based on the initial (or historical) user-related data collected with regards to user interactions, which comprise user-device interactions, user-network interactions, and user-resource interactions. The unique user profile therefore comprises data about computer input device patterns that are associated with the particular user in view of past events that were monitored, measured, and determined to be within given parameters or measurements that characterize these patterns for that user, thus defining the user profile.

After collecting of the initial user-related data, and generating the unique user profile, the user-device interactions, the user-network interactions and the user-resource interactions are monitored as described below in real time to collect real-time user-related data. The real-time user-related data comprises real-time user-device interactions data, real-time user-network interaction data and user-resource interactions data. The real-time user-related data may be collected at a regular time interval.

The user-device interactions (630) (also referred to herein as "user-machine interactions") are monitored by the processor 100. Monitoring of the user-device interactions (630) comprises real-time monitoring of user-device interactions data including metrics such as mouse displacements initiated by the user, keystrokes on the keyboard, instances of touch-screen interactions or any other input/output interaction of the user device with a peripheral (peripheral devices), such as a trackball or a stylet, etc.

The user-network interactions (842) are monitored by the processor 100. Such monitoring of the user-network interactions (842) comprises real-time monitoring of the resources that are used, queried or accessed by the user device in response to user's request on the internal equipment such as servers, network components, storage devices, etc., and external resources, such as websites, remote file transfer protocol (FTP) servers, software as a service (SAAS), infrastructure as a service (IASS) and platform as a service (PARS) solutions, etc.

For example, the user-network interaction data may comprise data on interactions with an edge device 202 in the internal network 844 and external systems 880 in external network 846. The user-network interaction data may also comprise location data 136 (for example, location of endpoint devices 304 with respect to locations of networks and systems with which the user is interacting) which may be collected from a GPS satellite 138 and/or cellular tower 140.

The user-resource interactions (248) are also monitored by the processor 100. Monitoring of the user-resource interactions (248) to obtain user-resource interactions data includes the real-time monitoring of interaction between user device(s) and devices of other users, as well as interactions between user device(s) and resources 250, which may be, for example, other systems 254, services 258, data centers 256 and other facilities 252 (the resources accessible at these locations including, without limitation, files, data, processor computation power and other computer resources).

It should be noted that each one of the servers and processors as described herein comprises a corresponding server memory which comprises one or more storage media and generally provides a place to store computer-executable program instructions according to the steps of the method described herein. The server memory may be implemented including Read-Only Memory (ROM) and/or Random-Access Memory (RAM). In accordance with non-limiting embodiments of the present technology, the servers as described herein are configured to execute an application by performing the computer-executable program instructions according to the steps of the method described herein.

Figure 2:
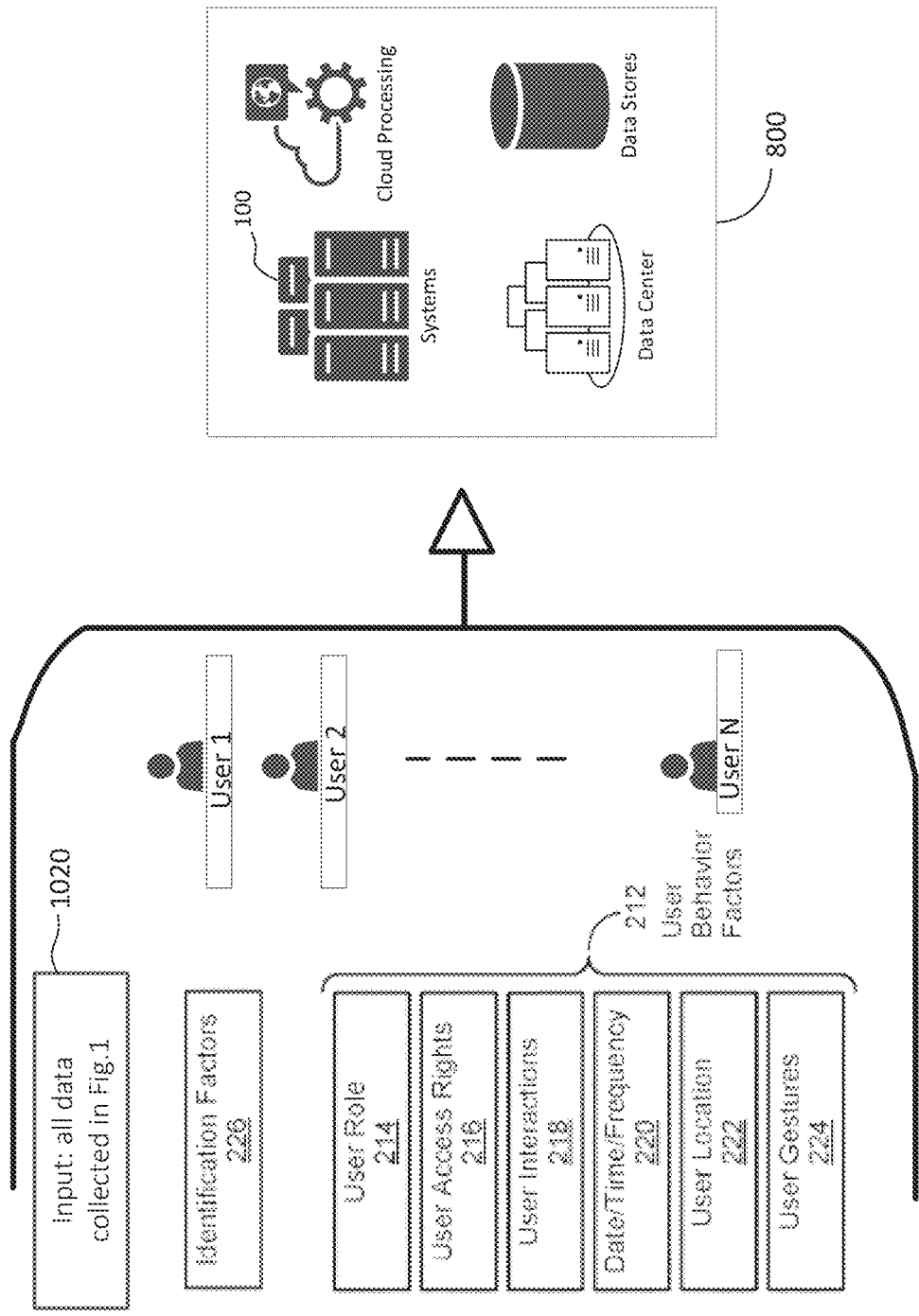
FIG. 2 is a schematic diagram illustrating a system for the processing and storage of the digital identities using inputs including the user interactions, according to an embodiment of the invention.

Now referring to FIG. 2, which relates to user profiling, there is shown how the unique digital identity of the user is generated. FIG. 2 depicts the system 800 which is configured to collect user-related data 1020 (comprising user-network interaction data, user-device interactions data and user-resource interactions data), process the data collected to generate the unique digital identity, and store the digital identities. The system 800 for the processing and storage of the digital identities can perform processing and transmit digital identities to storage, thus storing the digital identities locally or remotely (server, cloud, etc.). For example, the digital identities may be stored in the data storage of the system 800 and/or directly in risk data storage 900 discussed further below.

The system 800 comprises one or more processors, as well as data centers and data storage (also referred to herein as "data stores"). Processor 100 may be one of the processors of the system 800. It should be understood that the processor 100 may comprise more than one processor, and such processors may be located remotely with each other. FIG. 2 also schematically illustrates cloud processing in the system 800. The data storage may be implemented, for example, as a computer-readable storage medium such as for example, hard disk drives (HDD), solid-state drives (SSD), etc.

The system 800 receives identification factors 226 and user behavior factors 212 for each one of N users, and, based on the identification factors 226 and user behavior factors 212, generates the digital identities for each one of N users. The user behavior factors 212 comprise: user role 214, user access rights 216, user interactions 218 and date/time/frequency 220 of the interactions (which comprise user-device interaction data, user-network interaction data and user-resource interaction data described above), user location data 222, and data on user gestures 224 measured/determined by the peripheral devices.

Figure 3:
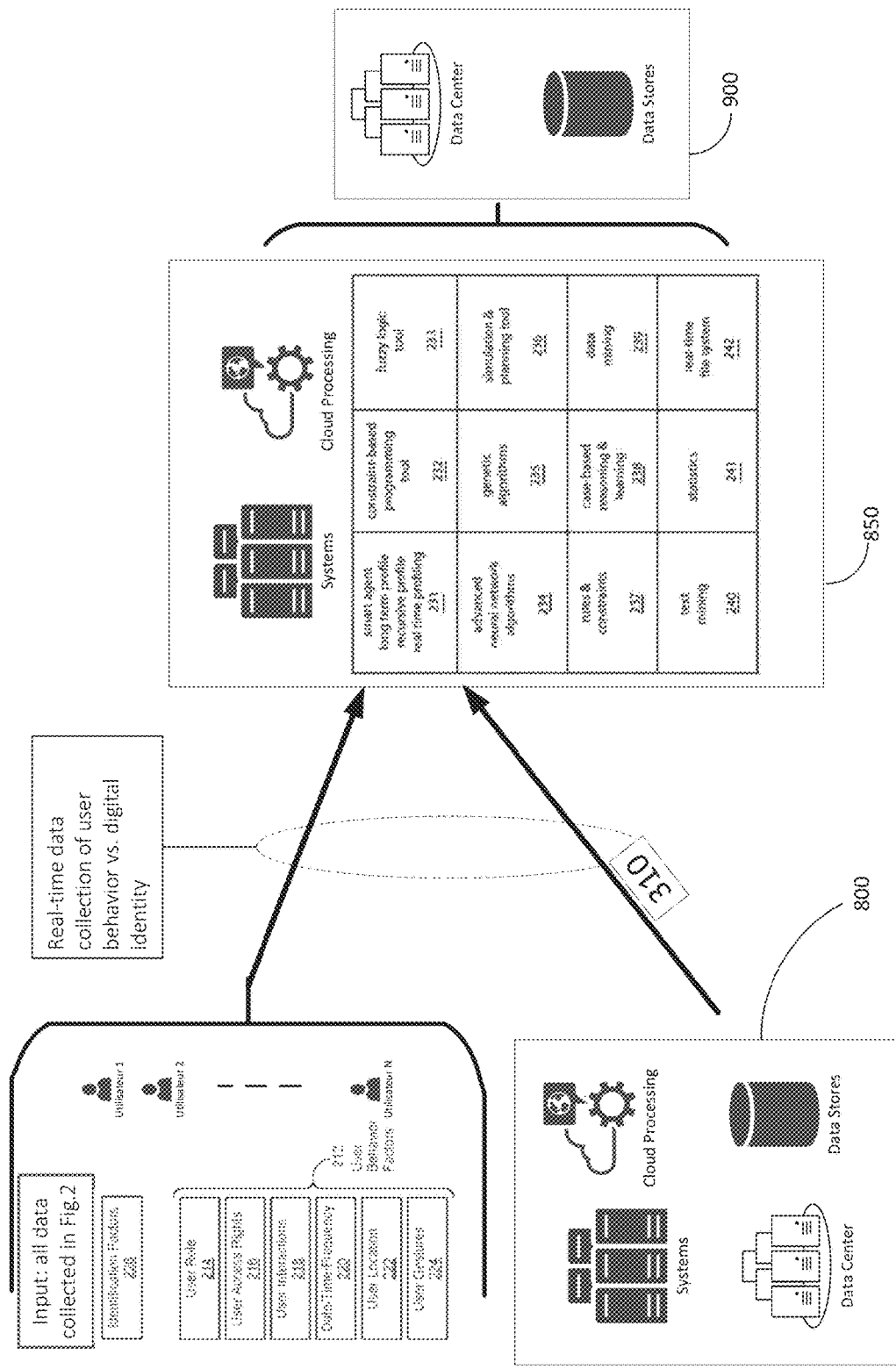
FIG. 3 is a schematic diagram illustrating a risk processing system using inputs including the real-time user interactions which are compared in real time with the corresponding digital identities, according to an embodiment of the invention.

Now referring to FIG. 3, there is shown a user behavior analysis performed by the system 800, including anomaly detection and preliminary risk analysis. The same input data is used as in FIG. 2, with the notable addition of the digital identity 310 (for each user) as determined by the system 800 for the processing and storage of the digital identities. It means that the new input data (same as those used to determine the digital identity, i.e., the user interactions which form its behavior) are collected and used in real-time, and compared in real-time to the earlier determined digital identity 310 to determine an anomaly in the behavior (and/or behavioral change) from the input data (also referred to herein as "real-time user-related data") in comparison with the digital identity.

This real-time user interaction data is collected and compared to the data in the user's unique digital profile and digital identity by a risk processing engine 850 (also referred to herein as a "first risk processing engine"). According to an embodiment, this user behavior monitoring service uses machine learning to output the detection of an anomaly in the real-time data feed of user interactions in view of that user's digital profile to detect an anormal change in the behavior, as determined by the machine learning algorithm previously trained using appropriate data.

The risk processing engine 850 comprises processor(s) configured to perform cloud processing, as well as: a smart agent 231, a constraint-based programming tool 232, a fuzzy logic tool 233, an advanced neural network routine 234, a generic algorithms routine 235, a simulation and planning tool 236, a rules and constraints routine 237, a case-based reasoning and learning routine 238, a data mining routine 239, a text mining routine 240, a statistics routine 241 and a real-time file system 242. Each one of those may run in parallel and/or sequentially and configured to perform processing tasks or monitor specific user interactions as their respective name suggest.

A risk data storage 900 is also shown in FIG. 3. The risk data storage 900 receives and stores the results of the risk analysis from the risk processing engine 850.

The risk processing engine 850 can detect, receive, and use as inputs: micromovements of the mouse (peripheral of the computing device); typing speed of the detected keystrokes on the keyboard, e.g., when typing text; period of activity on the device; process consumption of the computing device, etc. It should be noted that the inputs will change depending on the system/machine being used. For example, for an industrial machine, joystick inputs could be used (or buttons, handles, controllers, throttles, etc.). Furthermore, for mobile phones, tablets or tactile control panels of various machines, touch screen interface inputs could be used. Also, voice or eye commands could also be used as inputs to the risk processing engine 850.

Figure 4A:
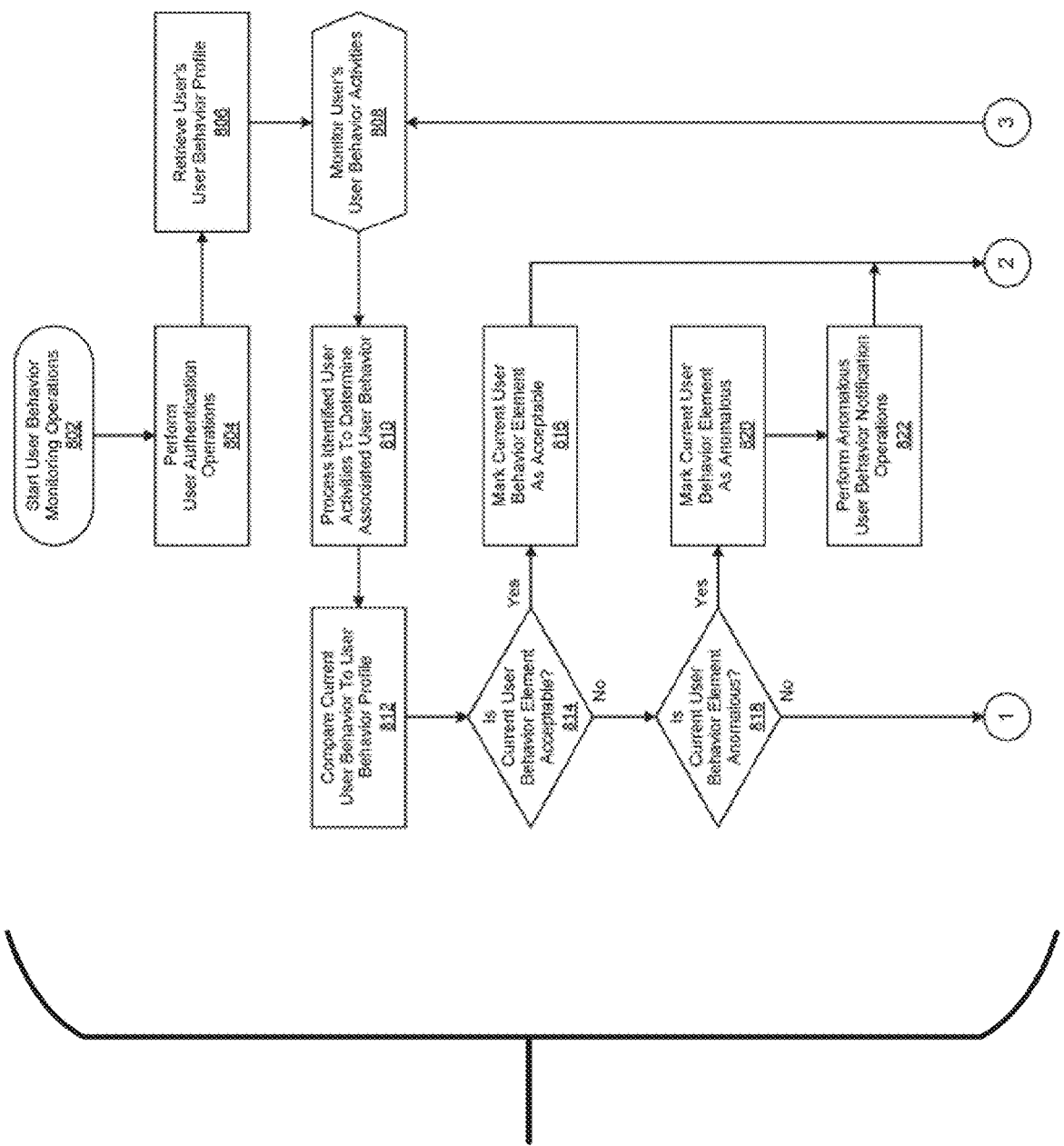
FIGS. 4A-4B are flowcharts illustrating a method of operating the risk processing system, according to an embodiment of the invention.
Figure 4B:
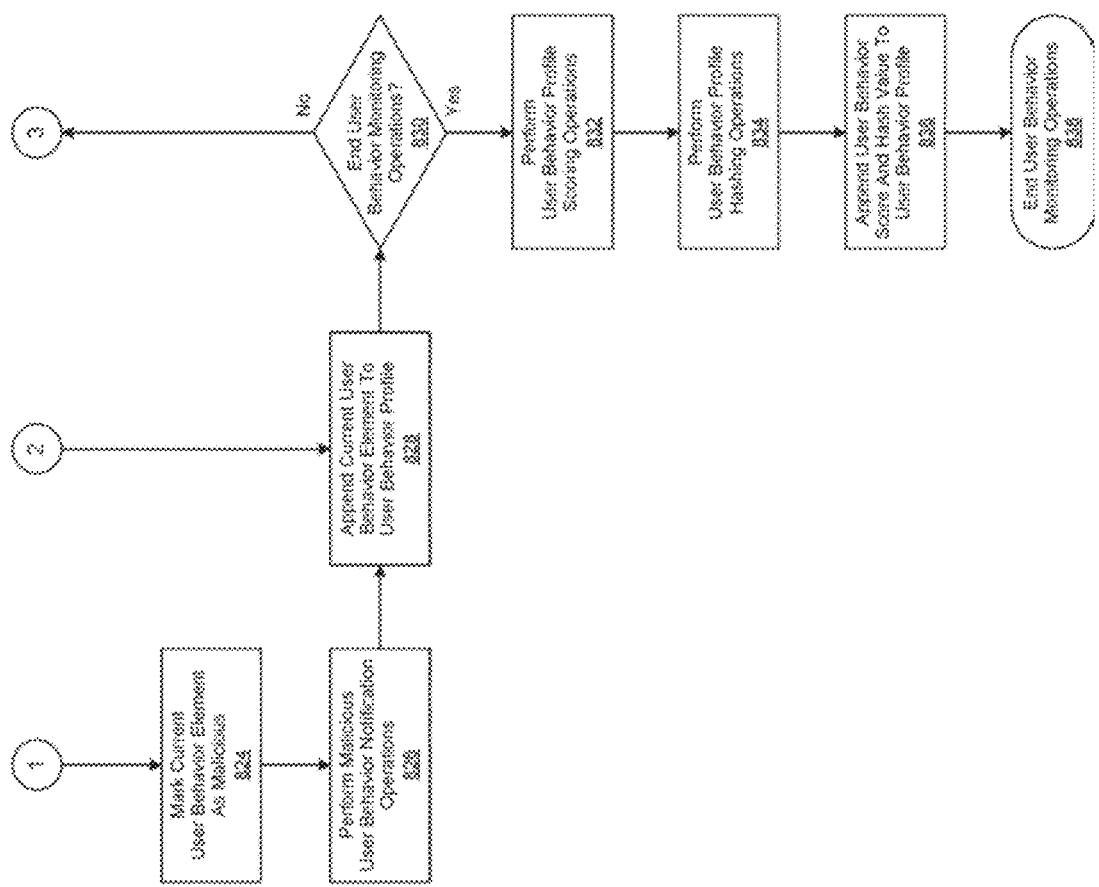
Figure 4B:
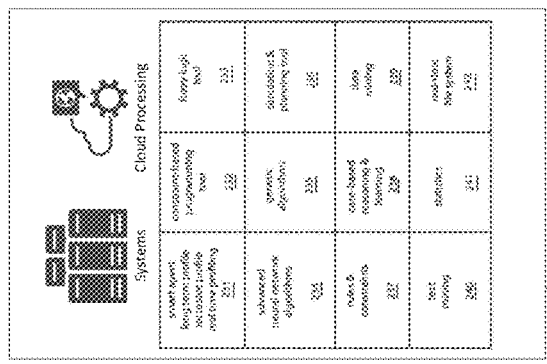

Now referring to FIGS. 4A-4B, there is shown a process performed by the risk processing engine 850 to monitor, in real time, a behavior of the user by monitoring their interactions with devices, network and resources. The flowchart is shown continuously over the two figures (FIG. 4B is FIG. 4A continued).

At step 802, the user behavior monitoring operations are started. At step 804, the risk processing engine 850 performs user authentication operations (for example, by displaying a prompt to enter a username and a password and capturing the information entered by the user which is at that moment is an unidentified user). At step 806, the risk processing engine 850 retrieves a user behavior profile (unique user profile and/or digital identity) corresponding to the authentication operation result from storage.

At step 808, users behavior activities are monitored by identifying, detecting (e.g., interactions), measuring (e.g., number, speed, etc.), catching transmission, etc. At step 810, the identified (detected, measured) user activities are processed to determine associated user behavior. At step 812, current user behavior is compared with user behavior profile, if, at step 814, the risk processing engine 850 determines that the current user behavior element is acceptable, then the current user behavior element is marked as acceptable at step 816 and the process continues directly to append the current user behavior element to the (existing) user behavior profile at step 828 (illustrated in FIG. 4B).

if, at step 814 (illustrated in FIG. 4A), the risk processing engine 850 determines that the current user behavior element is not acceptable, the risk processing engine 850 determines whether the current user behavior element is anomalous at step 818. If the current user behavior element is anomalous then, at step 820, the risk processing engine 850 marks current user behavior element as anomalous. Following performing anomalous user behavior notification operations at step 822, the process continues to step 828 (FIG. 4B). If the current user behavior element is not anomalous, then the current user behavior element is marked as malicious at step 824 and a malicious user behavior notification operations are performed at step 826, which are followed by appending current user behavior element to user behavior profile at step 828.

Such cycle of monitoring of user behavior continues until, at step 830, the risk processing engine 850 determines that it is time to end the user behavior monitoring. For example, a time period allocated for monitoring may end.

At step 832, risk processing engine 850 performs user behavior profile scoring operations. At step 834, risk processing engine 850 performs user behavior profile hashing operations. At step 836, risk processing engine 850 appends user behavior score and hash value to user behavior profile. At step 838, user behavior monitoring operations end.

Figure 5:
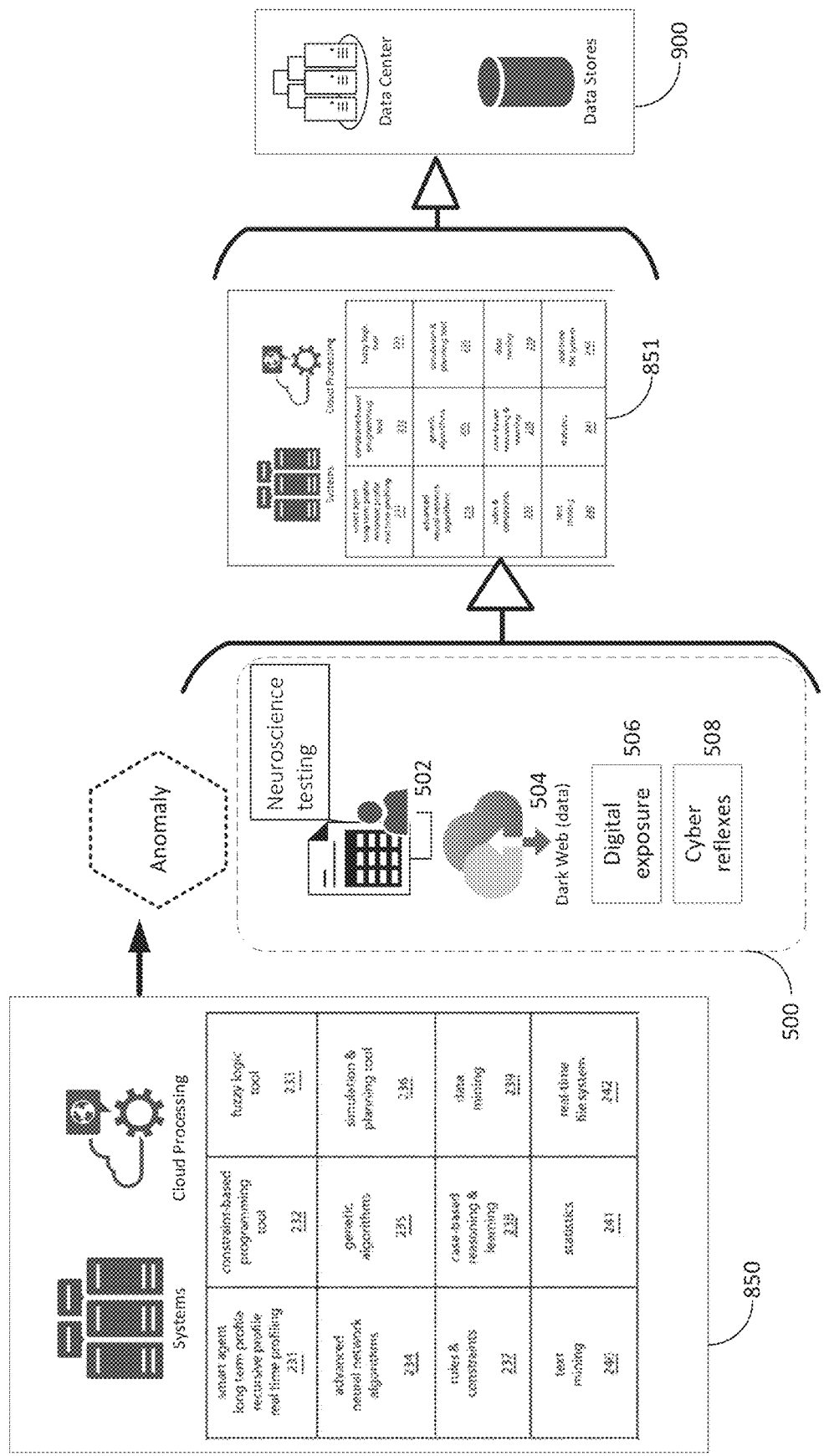
FIG. 5 is a schematic diagram illustrating an integrated risk processing system using inputs including the output of the risk processing system of FIGS. 3, 4A-4B, i.e., detection of an anomaly from the real-time user interactions which are compared in real time with the corresponding digital identities, and the results of a neuroscience testing and OSINT, deep and dark web data to detect and reduce risk and impact of a cybersecurity event, according to an embodiment of the invention.

Now referring to FIG. 5, there is shown the method according to another embodiment of the present disclosure, in which the anomaly (in other terms, the existence of the anomaly), or probability of an anomaly, is detected by the risk processing engine 850 and the output therefrom (existence of an anomaly and/or probability of an anomaly) is combined with additional information. That is, in addition to the data generated by the risk processing engine 850 with the method of operation of the risk processing engine 850 described in relation with FIGS. 4A-4B, the method uses the additional data (also referred to herein as "complimentary data") as mentioned above, not specifically monitored by monitoring user interactions on their computer but rather via external data collection, such as data from the Dark Web, data from neuroscience testing and data from web presence of the user.

A risk alarm can be triggered based on a probability of an anomaly with greater accuracy and certainty. By combining the probability of an anomaly with this complementary data related to user behavior and context around the user, a more accurate level of risk associated with the probability of an anomaly can be determined.

FIG. 5 illustrates a more integrated risk processing engine 851. The integrated risk processing engine 851 (also may be referred to as a "next generation risk processing engine" or a "second risk processing engine") comprises the processing capacity of the risk processing engine 850, and integrates the complementary data 500 as mentioned above. In some embodiments, the integrated risk processing engine 851 and the risk processing engine 850 may be implemented as one engine.

The complimentary data 500 may comprise: data from neuroscience testing (neuroscience testing results 502), data from the Dark Web (dark web data 504), data from web presence of the user (digital exposure data 506), and cyber reflexes data 508.

According to an embodiment, the method comprises collecting the following four types of complementary data used as inputs for the integrated risk processing engine 851, in addition to the probability of an anomaly from the risk processing engine 850.

1) Neuroscience testing results 502: The neuroscience testing can be performed and its neuroscience testing results 502 are fed to the integrated risk processing engine 851 to identify a change in the psychological and physiological profile of the user and the behavior of the user with the computing devices, network and resources. The neuroscience testing involves a neuroscience exercise (testing) performed by the user. The responses/results of the neuroscience exercise (neuroscience testing results 502) are inputs to the integrated risk processing engine 851.

The user may be prompted to answer questions on one of endpoint devices 305 and/or perform other exercises. For example, this engine for neuroscience testing exercises may include monitoring of the mouse micromovements; prompting of questions and collection of responses which involve a strong cerebral activation; measuring cerebral and cognitive latencies; the monitoring of data indicative of a change in social behavior.

2) Dark web data 504: Stolen identity data and stolen credentials such as user names and passwords can sometimes be found for sale on the "dark web". By monitoring the dark web, especially the presence of stolen identity data and stolen credentials and how many times such stolen identity data and stolen credentials appear in the searches, a risk of victimization can be determined. The dark web data is collected, preferably automatically (e.g., web scraping) such that the risk of victimization from the dark web is assessed and the result of such assessment (the value of the risk of victimization) is fed to the integrated risk processing engine 851. Alternatively, the integrated risk processing engine 851 may determine the value of the risk of victimization based on the dark web data collected.

3) Digital exposure data 506: How much the person is exposed on the internee, including on the social networks and open data sources (OSINT, etc.), deep Web, is used to evaluate a risk of targeting of that person depending on their role in the organization. This risk of digital exposure can be evaluated automatically by the integrated risk processing engine 851 by identifying and indexing all relevant pages such as the social networks. The integrated risk processing engine 851 then determines a value of digital exposure risk for each user based on the level of activity detected for the user (such as posts, comments, likes to other pages or from other users, etc.), the level of connectivity with others, etc.

4) Cyber reflexes data 508: Test phishing campaigns or tests of knowledge in cybersecurity can be performed to identify the user's cyber reflexes. A level of user's cyber reflexes may be determined for and associated with each user.

Depending on the complementary data, especially the dark web data 504, the digital exposure data 506, and the cyber reflexes data 508, a greater level of sensitivity can be given when a potential anomaly is detected (e.g., alarm triggered with an anomaly of lesser importance). In other words, these four types of the complementary data are used to perform a cartography, or classification, of the user profile and how probable a cybersecurity event would be in view of that classification. The neuroscience testing results 502 may be rather used as a complement to the detected potential anomaly in that they also indicate either a change in the behavior of the user (the actual authorized user), or otherwise that the user (the unidentified user) is not the expected person (not the actual authorized user).

Machine learning may be used in the integrated risk processing engine 851 to combine all the inputs (an integrated risk processing engine input data comprises the anomaly of the behavior and/or behavioural change and the complimentary data) and provide the output: the alarm triggered or not triggered.

With the integrated risk processing engine input data used as inputs, the integrated risk processing engine 851 performs a cartography of a risk profile over time and generates (automates) the response (orchestration). In addition, the integrated risk processing engine 851 determines a level of exposure to a hazard. The response involves triggering an alarm to the cybersecurity response team to address the situation in the context. The response may further involve denying access to a resource to a user having triggered the alarm. For example, the integrated risk processing engine 851 may generate a request to deny access to the resource to the user that triggered the alarm.

The unique user profile and the digital identity of the user may be updated based on the real-time user-related data and the anomaly in user's behavior. In some embodiments, updating the unique user profile and the digital identity of the user based on the anomaly in user's behavior may be performed in response to determining that the anomaly possesses a low risk of a cybersecurity event.

FIG. 5 also illustrates the risk data storage 900 which stores the results of the risk analysis generated and transmitted by the integrated risk processing engine 851, including the updated digital identity of the user. The integrated risk processing engine 851 transmits the results of the risk analysis to the risk data storage 900 and updates the digital identity of the user stored in the risk data storage 900.

According to an embodiment, the method and system described herein may be integrated in various environments. The method may operate within one network and/or remotely.

By detecting anomalies in the user behavior, the method as described herein is versatile and may operate as a firewall that prevents users with an abnormal behavior from accessing resources. It can also help to train employees regarding their attitude and behavior in general when browsing the web (i.e., the World Wide Web) and to make the employees more aware of threats such as phishing.

The user recognition is quasi biometric, since the identity is verified by measuring physiological data in the user-machine interaction (mouse micromovements, keystroke speed, etc.). Also, by using a machine learning algorithm, an identity based on such measured physiological data in the user-machine interaction can be generated from the historical monitoring, and deviations to the expected pattern for that identity are detected from the continuing monitoring.

It should be noted that the method as described herein is particularly useful to determine that an unidentified user, with proper credentials or an authorized device, is not the actual authorized user (authorized person), but rather a thief using stolen credentials or a stolen device by using, for example the deviation from the digital profile or differences detected based on neuroscience-based testing.

The method as described herein allows identifying that the user (the actual authorized user or, in other terms the "right person") is undergoing changes in their own behavior. In other words, the method as described herein may identify that there is a significant psychological change from the usual profile of the actual authorized user (due to, for example, stress, anxiety, intellectual changes). Such detection of the significant psychological change may be performed by analysing responses to questions and by monitoring changes in user-device interactions data collected by the system(in other words, by using questions with a strong cognitive component and by monitoring changes of user-machine interactions which are highly personal).

Therefore, in addition to the detection of the wrong person (the unidentified user) using the computer (e.g., a person maliciously using another person's computer which is not turned off or not logged off) or using the stolen credentials, the method can identify that the person (the actual authorized user) is not behaving normally and can be highly nervous (about to commit a criminal activity such as a theft), under the influence of someone else (blackmailing) or under the influence of a drug. Therefore, direct criminal activity, or indirect criminal activity (blackmailing such that the theft is performed by an employee cooperating with criminals under external pressure) can both be detected, thereby addressing human risk of cybersecurity events.

For example, the method as described herein, and the system performing the method, is capable of distinguishing an automated process or macro which would override endpoint protection platform (EPP) or endpoint detection and response (EDR) solutions by using virtual peripherals of user interaction (virtual keyboard or mouse), e.g., during an attack using a "RubberDucky" USB key, or a "Remote USB Smart Dongle". This is because the method, constantly monitoring user-machine interaction data in real time, is or acts as a Perpetual Authentication Process which is more focused on biometric monitoring and computer interaction monitoring in real time, continuously over the whole period of use of the resources, which differs from a password used only before accessing the resources, for example.

This is why the method as described herein also may permit to identify a brutal and significant change in the user behavior which relate to the user intentions when using or accessing resources using a computer. Therefore, a potentially malicious intention may be detected before a cybersecurity event, such as a theft of sensitive data or blackmailing, because such activities cause a change in the user-machine interaction data that are monitored.

Learning and Biometric Recognition

In at least one embodiment of the disclosure, the user's biometrics is analyzed based on several factors. A click speed (timing of pointer/mouse button down and mouse button up) may be measured and used to analyze the user's biometrics. This click speed is different for each human based on a correlation of contextualized data between the click made by the index finger and the click made by the middle finger (this pattern applies to both left and right-handed individuals). The measured trajectories and velocities of the mouse micromovements before and after the click may be used to identify the physiognomic imprint. For example, such physiognomic imprint may be part of the unique user profile. The acceleration and deceleration of the movement during a trajectory leading to a mouse click, distance or precision of micromovements during a mouse click, the speed of keystrokes on the keyboard, the cadence and rhythm of keystrokes on the keyboard may be also detected and analyzed. Other data that is detected and analysed comprises: micromovements of a pointer during a transition from immobility of the latter to a targeted movement when the individual (user 1002) puts his/her hand on the mouse, in other terms, in response to the user's physical interaction with the computer mouse.

The combination of the most differentiating elements from such a non-exhaustive list may be also an element of identification because such a combination is specific to each individual. This biometry may be distinct for the same individual (user 1002) depending on the computer input device used (peripheral device of the user device 102 or other endpoint device 304), this element is also part of the identification and behavioral analysis process.

In at least one embodiment, the machine learning of the neuro-physiognomic biometry of the individual is performed based on individual answers to a series of questions of various complexities in order to differentiate the biometric physiognomy and a psychometry specific to each user. For example, the user may be prompted to respond various questions. A prompt to respond to the questions may be sent from the system 800 to one of endpoint devices 304.

The responses to such questions may express certainty of the individual (such as, for example, response to a simple mathematical question), discomfort (due to answering complex behavioral and societal multiple-choice questions). User's response may express determination based on simple behavioral and societal binary question responses. Based on such responses received, the server may determine median thresholds and standard deviations of the individual (for example, based on simple and unchanging multiple-choice questions related to the person and his/her environment).

Initial and continuous learning processes allow the integrated risk processing engine 851 to define and update the fingerprint and the thresholds of the physiognomic biometrics linked to the computer input devices used by the same user (such peripheral devices as a mouse, a touch pointer, a touch screen, a mechanical/traditional keyboard, a virtual keyboard, etc.). The biometric fingerprint of the physiognomy linked to the computer input devices evolves throughout the life cycle of the user account, allowing the insertion and integration of the individual's physiological microchanges.

Detection and Behavioral Understanding of Macro Changes.

In at least one embodiment, when behaviors significantly exceed thresholds of physiognomic biometrics usually recorded for a user, a multiple authentication phase is executed by the integrated risk processing engine 851 through other means of identification (call via phone number, message or application, password coupled with initial profile information).

If the user is not recognized through the other means of authentication, then the account is identified by the integrated risk processing engine 851 as compromised or at risk based on the other variables used. The variable that may be used are: recent changes in the digital footprint surface web, deep/dark web, open-source intelligence (OSINT) and policy enforcement point (PEP), results of the latest cybersecurity awareness tests, new access privileges recently obtained, and identification request sent to a referrer chosen by the user within the organization.

If the unidentified user is recognized as an authorized user, but the macro change persists, then the user may be prompted to answer a few questions such as those that were used to complete the initial learning. In some embodiments, such an under-investigation user may be prompted to answer other more direct and binary questions related to the actual risks identified in the user's context: data theft, participation in digital fraud, mental health, physical health. The trajectories and response times associated with the under-investigation user are detected and collected by the integrated risk processing engine 851, and are then compared to the initial and ongoing profile of the authorized user. Based on these trajectories and response times, the integrated risk processing engine 851 may determine (generate) an updated risk value and generate and transmit an alert to appropriate organizational bodies for doubt removal and post-investigation action. The integrated risk processing engine 851 may also generate an alert that may act as a deterrent to a premeditated or future illegitimate action.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for determining a risk of a cybersecurity event related to a user, the method executable by a system comprising a processor coupled to a first risk processing engine and a second risk processing engine, the system being communicatively coupled to a user device having peripheral devices configured to interact with a user, and a storage for storing a unique user profile and a digital identity, the method comprising:
   collecting, by the processor, an initial user-related data associated with user interactions, the user-related data comprising user-device interaction data generated in response to user interactions with the peripheral devices, user-network interaction data generated in response to user-network interactions, and user-resource interaction data generated in response to user-resource interactions;
   determining, by the processor, the unique user profile and generating the digital identity of the user based on the initial user-related data;
   collecting, by the first risk processing engine, in real time and repeatedly, a real-time user-related data associated with real-time user interactions during a first period of time, and detecting, by the first risk processing engine, an anomaly in user's behavior based on the collected real-time user-related data and the digital identity of the user;
   collecting, by the second risk processing engine, a complementary data associated with the user and determining a cartography of a risk profile of the user based on the complementary data, the complementary data comprising neuroscience testing results of a neuroscience exercise performed by the user, a dark web data, and a digital exposure data; and
   determining, by the second risk processing engine, the risk of the cybersecurity event based on the anomaly in the user's behavior in combination with neuroscience testing results, a value of the risk of victimization determined based on the dark web data and a value of a digital exposure risk determined based on the digital exposure data, in real-time over a complete period of use of resources, and updating the unique user profile and the digital identity of the user based on the anomaly in user's behavior and the risk of the cybersecurity event,
   wherein the neuroscience testing results are collected by a neuroscience testing prior to determining the risk of the cybersecurity event.

2. The method of claim 1, wherein user-device interactions data comprises data related to micromovements of a computer mouse, measured click speed and typing speed of detected keystrokes on a keyboard.

3. The method of claim 1 further comprising measuring trajectories and velocities of a computer mouse micromovements before and after a click of the user in response to user physical interaction with the computer mouse.

4. The method of claim 1, further comprising generating an alert in response to the risk of the cybersecurity event.

5. The method of claim 1, wherein determining the unique user profile further comprises determining a user digital signature.

6. The method of claim 1 further comprising training a machine learning algorithm and using machine learning to determine the anomaly based on a real-time data related to user interactions.

7. The method of claim 1, wherein the complementary data further comprises a cyber reflexes data.

8. The method of claim 1 further comprising determining a level of exposure to a hazard.

9. The method of claim 1, wherein user-device interactions data comprises data related to a process consumption of the user device.

10. The method of claim 1 further comprising updating the unique user profile and the digital identity of the user based on the real-time user-related data.

11. The method of claim 1 wherein updating the unique user profile and the digital identity of the user based on the anomaly in user's behavior is in response to determining that the anomaly possesses a low risk of a cybersecurity event.

12. The method of claim 1 wherein the dark web data comprises determined presence of user-related data in dark and deep web resources and the digital exposure data comprises data on exposure of the user from open-source intelligence (OSINT).

13. A system for determining a risk of a cybersecurity event related to a user, the system comprising
- a processor coupled to a first risk processing engine and a second risk processing engine, the system being communicatively coupled to a user device having peripheral devices configured to interact with the user, and a storage for storing a unique user profile and a digital identity,
- the processor configured to:
- collect an initial user-related data associated with user interactions, the user-related data comprising user-device interaction data generated in response to user-device interactions with the peripheral devices, user-network interaction data generated in response to user-network interactions, and user-resource interaction data generated in response to user-resource interactions;
- determine the unique user profile and generating the digital identity of the user based on the initial user-related data;
- the first risk processing engine configured to:
- collect, by, in real time and repeatedly, a real-time user-related data associated with real-time user interactions during a first period of time, and detect an anomaly in user's behavior based on the collected real-time user-related data and the digital identity of the user; and
- the second risk processing engine configured to:
- collect a complementary data associated with the user and determine a cartography of a risk profile of the user based on the complementary data, the complementary data comprising neuroscience testing results of a neuroscience exercise performed by the user, a dark web data, and a digital exposure data; and
- determine the risk of the cybersecurity event based on the anomaly in the user's behavior in combination with the neuroscience testin results, a value of the risk of victimization determined on the dark web data and a value of a digital exposure risk determined based on the digital exposure data, in real-time over a complete period of use of resources, and update the unique user profile and the digital identity of the user based on the anomaly in user's behavior and the risk of the cybersecurity event, wherein the neuroscience testing results are collected by a neuroscience testing prior to determining the risk of the cybersecurity event.

14. The system of claim 13, wherein the user-device interactions data comprises data related to micromovements of a computer mouse, measured click speed and typing speed of detected keystrokes on a keyboard.

15. The system of claim 13 wherein the system measures trajectories and velocities of a computer mouse micromovements before and after a click of the user in response to user physical interaction with the computer mouse.

16. The system of claim 13, wherein user-device interactions data comprises data generated in response to process consumption of the user device.

17. The system of claim 13 wherein the system is configured to update the unique user profile and the digital identity of the user based on the real-time user-related data.

18. The system of claim 13 wherein the system is configured to update the unique user profile and the digital identity of the user based on the anomaly in user's behavior in response to determining that the anomaly possesses a low risk of a cybersecurity event.

* * * * *